United States Patent [19]

Holmberg

[11] Patent Number: 4,551,374
[45] Date of Patent: Nov. 5, 1985

[54] CONTINUOUS SHEET WITH PERFORATED TEAR-OFF DRIVING EDGE AND RECESSED REINFORCED INNER EDGE

[75] Inventor: Thomas A. Holmberg, Richfield, Minn.

[73] Assignee: The Holmberg Company, Minneapolis, Minn.

[21] Appl. No.: 622,756

[22] Filed: Jun. 20, 1984

[51] Int. Cl.⁴ .................................................. B32B 3/08
[52] U.S. Cl. ........................................ 428/43; 428/67; 428/138; 428/192; 428/194; 281/5; 282/12 A; 282/21 R
[58] Field of Search .................. 428/43, 137, 138, 67, 428/192, 194; 281/5–14; 282/12 A, 21 R

[56] References Cited

U.S. PATENT DOCUMENTS 3,322,441 5/1967 Eichorn ................................ 281/5
4,447,481 5/1984 Holmberg ........................... 428/40

Primary Examiner—Alexander S. Thomas
Attorney, Agent, or Firm—John W. Adams

[57] ABSTRACT

An improved continuous sheet having tear-off perforated edge portions for use with toothed driving wheels (tractor drive transfer mechanism) adapted to mesh with the perforations to advance the continuous sheet in accordance with word processing and printing equipment, said sheet having a recessed, reinforced inner edge portion adjacent to the tear-off line of the perforated edge portion.

2 Claims, 2 Drawing Figures

CONTINUOUS SHEET WITH PERFORATED TEAR-OFF DRIVING EDGE AND RECESSED REINFORCED INNER EDGE

BACKGROUND OF THE INVENTION

With the present demand for continuous tractor drive sheets, it has been impossible to provide a final sheet having a reinforced inner edge without increasing the thickness of the marginal edge portion of the sheet. The conventional tractor drive perforated sheets are provided with a tear line which permits removal of the perforated driving portion of the sheet, thus producing the desired sheet width for the ultimate printed sheet size such as might be used for catalog sheets for ring binders and the like. Reinforcement of the attachment edge portion to prevent the sheets from tearing out of the connecting rings is impossible due to the previous necessity of increasing the thickness of the reinforced portion of the sheet by the thickness of the reinforcing layer.

SUMMARY OF THE INVENTION

The present invention provides a continuous sheet having a tear-off perforated driving edge with a recessed, reinforced inner edge portion adjacent to the tear line of the continuous sheet, so that the continuous tractor drive sheet is capable of being supplied in the conventional way, such as in an accordion folded form packaged in a suitable carton or in a continuous roll form without increasing the thickness of the reinforced portion. Such a reinforced edge was previously completely impractical for such continuous tractor-driven sheets.

DETAILED DESCRIPTION OF THE PREFERRED EMBODIMENT

Continuous perforated paper sheets are used with present word processing equipment and other high-speed printing and word processing equipment (not shown). The perforations are designed to receive in meshed relation the teeth of the tractor-drive wheels (not shown) in order to produce the necessary control for line-by-line feeding and indexing required for such printing and word processing equipment.

Figure 1:
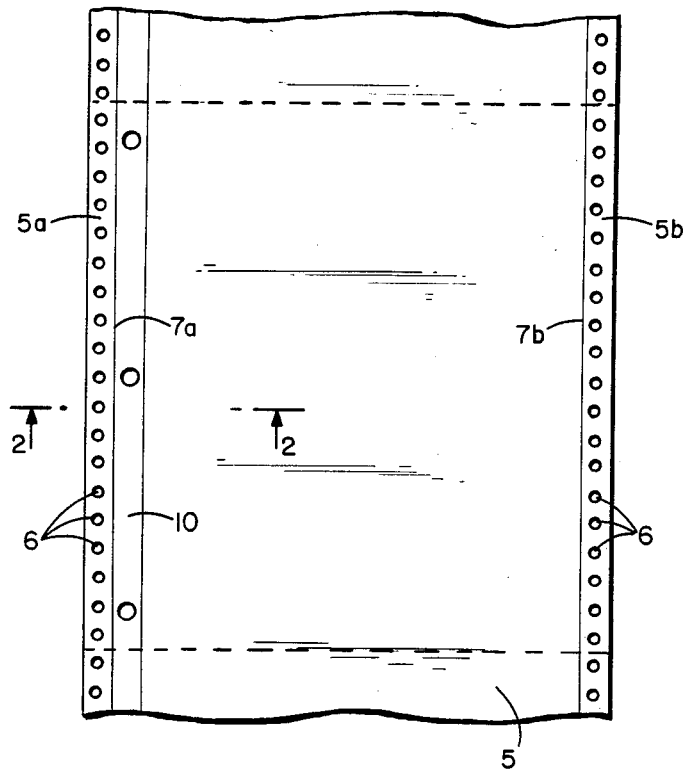
FIG. 1 is a top plan view of a portion of a continuous tractor-drive sheet.
Figure 2:
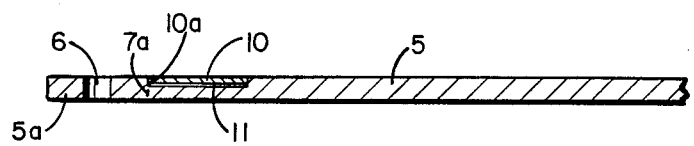
FIG. 2 is a fragmentary vertical section taken substantially along the line 2—2 of FIG. 1.

FIG. 1 shows a portion of a continuous sheet of paper designated by the numeral 5 having perforations 6 formed along both edges thereof. The perforated edges respectively have tear lines 7a and 7b which define tear-off edge portions 5a and 5b. A reinforcing strip 10 of material such as a polyester tape, including but not limited to Mylar manufactured by the Dupont Company of Wilmington, Del., is, in the form shown, applied to one side of the sheet 5. The strip 10 has its outer edge 10a positioned along one of the tear lines such as tear line 7a as illustrated.

The marginal edge portion of the sheet 5 disposed inwardly of tear line 7a is indented in any suitable manner such as that disclosed in U.S. Pat. No. 4,447,481 which is assigned to the same assignee as the present invention.

A suitable adhesive 11 such as but not limited to the hot melt adhesive formula No. 1P84024 manufactured and sold by Swift Adhesives, a division of Eschem, Inc., of Chicago, Ill., is used to permanently adhere the reinforcing strip 10 in the indented portion in the sheet 5 as described in said U.S. Pat. No. 4,447,481. The depth of the indented portion is substantially equal to the thickness of the reinforcing strip 10 plus the thickness of the adhesive layer for attaching the strip in the indented portion.

It will be seen that this invention provides a continuous sheet of paper having tear-off perforated edge portions particularly adapted for a tractor-drive feeding mechanism to maintain the accurate positional registration of the sheet required with present day high-speed computerized printing and processing equipment.

It should be pointed out that while the continuous sheet 5 has perforations 6 formed in the tear-off edges, it is frequently convenient to have drive perforations formed along only one edge thereof and in such an instance, the reinforcing strip 10 could be applied along either the perforated edge or the other edge. Also, the continuous sheet or ribbon is frequently provided with a transverse tear line which permits the same to be severed into the desired individual sheet sizes. The transverse tear lines may be extended through the perforated tear-off strips 5a and 5b to permit the individual sheets to be separated prior to removal of the strips 5a and 5b.

It is to be understood that while there has been illustrated and described certain forms of the present invention, the invention is not to be limited to the specific form or arrangement of parts herein described and shown except to the extent that such limitations are found in the claims.

What is claimed is:

1. A continuous sheet having a plurality of drive perforations formed along at least one edge portion thereof, the perforated driving edge portion of said continuous sheet having a tear line to permit removal of the perforated edge portion, a reinforcing strip permanently adhered to said sheet along the tear line on the opposite side of the tear line from the perforated driving edge portion, said strip being recessed into the edge portion of the sheet so that the thickness of said sheet reinforced by said strip is no greater than the full thickness of the remaining portion of the sheet to produce substantially uniform sheet thickness across the entire width of the continuous sheet before and after removal of the perforated edge portion.

2. The structure set forth in claim 1 and both edges of said sheet having perforated edge portions therealong, each with a tear line to permit removal of the perforated edge portions.

* * * * *